United States Patent Office 3,181,429
Patented May 4, 1965

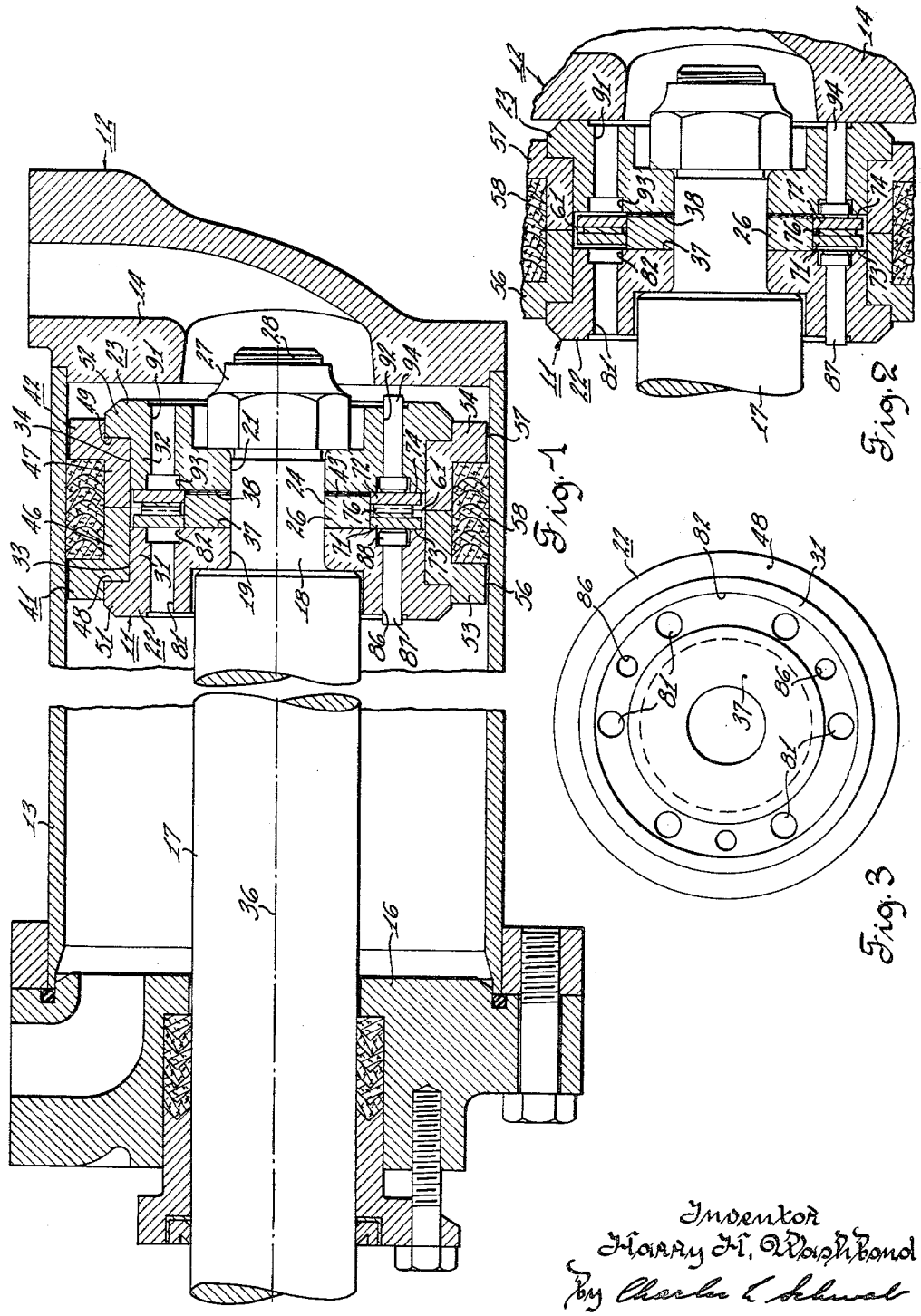

3,181,429
PISTON AND UNLOADING VALVE THEREFOR
Harry H. Washbond, Springfield, Ill., assignor to Allis-Chalmers Manufacturing Company, Milwaukee, Wis.
Filed Sept. 30, 1963, Ser. No. 312,403
6 Claims. (Cl. 91—401)

This invention relates to a new piston and a novel unloading valve therefor.

It is a general object of this invention to provide a piston having a valve mechanism whereby the pressure in the hydraulic cylinder will be relieved at less than pump relief valve setting when the piston reaches the end of its stroke.

It is a further object of this invention to provide a novel piston construction wherein the wear rings also serve as carriers for the piston packing and as spacers for the piston halves.

It is a further object of this invention to provide a novel unloading valve mechanism for a piston wherein a pair of valve rings with flat sealing surfaces are resiliently held against complementary flat surfaces on the axially confronting ends of the piston halves.

It is a further object of this invention to provide a compact piston construction incorporating an unloading valve.

It is a further object of this invention to provide a piston with unloading valve mechanism which may be economically manufactured.

It is a further object of this invention to provide a piston with unloading valve mechanism which will handle a large volume of oil with a minimum pressure drop thereby minimizing heating of the pressure fluid.

These and other objects and advantages of this invention will be apparent to those familiar with the art from the following description with reference to the drawings in which:

FIGURE 1 is a longitudinal section of a double acting hydraulic jack including a piston which incorporates the present invention;

FIG. 2 is a section of the piston shown in FIG. 1 showing the unloading valve mechanism in an open position; and FIG. 3 is an end view of one of piston halves.

Referring to FIG. 1, my novel piston 11 is shown installed in a double acting hydraulic jack 12 which includes a cylinder 13 with a closed end 14 and a rod end 16. The piston 11 is installed on a piston rod 17 which has a reduced diameter portion 18 extending through bores 19, 21 of piston halves 22, 23 and bore 24 of a spacer 26. A piston nut 27 is screwed onto threaded end 28 of the rod 17 and releasably fastens the piston 11 on the rod.

My piston halves 22, 23 are identical in construction thereby minimizing manufacturing costs and reducing spare parts inventory requirements. Reduced diameter portions 31, 32 are formed on the piston halves and present cylindrical surfaces 33, 34 which are coaxial with the piston axis 36.

The reduced diameter portions 31, 32 also present flat radially extending end faces 37, 38 in axially confronting relation to one another.

The piston halves or segments 22, 23 are maintained in a predetermined axially spaced relation to one another by a pair of nonferrous metal wear rings 41, 42 and the spacer 26 together with shims 43. The wear rings 41, 42, which may be made of a suitable rigid, wear resisting bearing material, have cylindrical portions 46, 47 with their adjacent axial ends in abutment with one another. The remote ends of the cylindrical portions 46, 47 are in abutting engagement with flat surfaces 48, 49 extending radially outwardly from the reduced diameter portions 31, 32, the flat surfaces 48, 49 being formed on enlarged diameter portions 51, 52 of the piston halves 22, 23. The wear rings 41, 42 have flanges 53, 54 which extend radially outward from the cylindrical portions 46, 47 thereof and terminate in cylindrical bearing surfaces 56, 57. These bearing surfaces serve to transmit side thrust to the inner cylinder surface without scoring the latter during operation of the jack. An appropriate packing 58 is installed between flanges 53, 54 and its inner periphery is in radial engagement with the outer cylindrical surface of cylindrical portions 46, 47 of the wear rings.

From the foregoing description it is seen that the wear rings 41, 42 not only serve as effective side thrust means for the pistons but also serve as radially outer spacing means for the piston halves 22, 23, as a carrier for the packing 58 and as the radially outer wall of an annular cavity 61 which they define together with the end faces 37, 38 of the piston halves and the spacer 26.

The mechanical unloading valve means includes a pair of valve rings 71, 72 which have flat sealing surfaces 73, 74 in axial engagement with the flat end faces 37, 38 of the piston halves 22, 23. A wave washer 76 of appropriate strength is interposed between the valve rings 71, 72 to resiliently urge them into engagement with the end faces 37, 38.

Referring also to FIG. 3 it will be noted that piston half 22 is provided with a plurality of axially extending openings 81 which terminate at their axially inner end in an annular groove 82 facing the cavity 61. A second set of axially extending passages 86 is provided in piston half 22 to loosely receive the unloading pins or thrust elements 87. The thrust elements 87 have heads 88 the diameter of which is less than the radial width of the groove 82. The axial thickness of the heads 88 is less than the axial depth of the groove 82 so as to permit the valve ring 71 to seat. The groove 82 thus serves as a recess for the heads 88 of the pins 87 and also as a means for providing the proper exposure of the ring 71 to the pressure fluid in the rod side of the jack. Further the groove 82 provides even distribution of fluid relative to ring 71.

The piston halves 22, 23 are of identical construction and accordingly the number of passages 91 and bores 92 in piston half 23 are the same as in piston half 22. Further the groove 93 will be of the same construction as groove 82 and the three pins 94 used in piston half 23 are identical to pins 87.

As is apparent from the drawings and foregoing description, my piston construction is extremely compact in axial dimension thereby providing maximum jack stroke. Also my piston uses maximum interchangeability of parts and is of a design that can be conveniently manufactured with conventional machine tools. The flat end faces 37, 38 are ground with conventional equipment to provide a microinch finish. The flat sealing faces 73, 74 of the valve rings 71, 72 are also ground with conventional equipment to the required microinch finish. The precision finishes thus provided will permit effective sealing of the piston against flow of fluid therethrough. In assembling the piston the appropriate number of shims 43 are selected to properly space the pistons at their inner diameter so that the piston halves are not deformed when the nut 27 is tightened.

This invention is particularly adaptable to dual hydraulic jack applications such as in double acting hydraulic jacks for a bulldozer. In such structures, particularly where tilting of the mold board is required, one jack must reach the end of the stroke in advance of the other. When this occurs one jack bypasses the pump delivery therethrough by the loading valve means incorporated in the piston thereby preventing relief valve pressure from acting to twist the tractor frame structure.

As shown in FIG. 2, the valve ring 72 is forced off its seat by the pins 94 which abut the closed end 14 of the jack. Thus, assuming that a dozer attachment is supported by the rod 17 of the hydraulic jack, only sufficient pressure to support the dozer attachment will be required on the rod side of the jack. This pressure will be sufficient to move the other valve ring 71 off its seat as illustrated in FIG. 2 thereby permitting fluid to pass from the rod end of the cylinder to the closed end of the cylinder by way of passage 81, cavity 61 and passage 91. The circular grooves 82, 93 in my piston halves serve as fluid passages to the openings 81, 91 and also reduce the seal area between the seal rings and piston halves to two narrow circular surfaces. Limiting the sealing area between the valve rings and the end faces of the piston halves reduces the chances of foreign matter lodging between the sealing surfaces. Large flat sealing surfaces are more apt to hold foreign matter between them thus increasing the possibility of the seal becoming ineffective. Although the pins 87, 94 have a sufficiently loose fit in their bores 86, 92 to permit some fluid flow between the pin and the bores, I prefer to employ separate fluid passages 81, 91 to provide large flow capacity during unloading at the end of the stroke.

When the piston reaches the rod end of the cylinder the pins 87 will abut against the rod end 16 to permit transfer fluid through the piston in a manner similar to that hereinbefore described for the bottoming of the piston on the closed end 14.

Having now particularly described and ascertained the nature of my said invention and the manner in which it is to be performed, I declare that what I claim is:

1. A piston comprising,
 a pair of piston segments having
  reduced diameter portions in axially facing relation to one another and presenting, respectively,
   cylindrical surfaces coaxial with said piston and with one another, and
  enlarged diameter portions presenting
   flat surfaces, respectively extending radially outward from said reduced diameter portions,
 a pair of wear rings of nonferrous material having
  cylindrical portions, respectively, with
   adjacent ends in axial abutment with one another and
   remote ends in engagement, respectively, with said flat surfaces and
  flanges extending, respectively, radially outward from said remote ends and each terminating in a cylindrical bearing surface,
 a spacer between said segment in radially inward spaced relation to said wear rings, said wear rings, piston segments and spacer defining an interior cavity,
  mechanical unloading valve means in said piston between said spacer and wear rings,
 a packing between said flanges and in radial engagement with said cylindrical portions of said wear rings, and
 means releasable fastening said piston segments together thereby maintaining said ends of said wear rings in abutment.

2. The structure set forth in claim 1 wherein said reduced diameter portions have flat radially extending end faces, respectively, in said cavity, wherein said segments have circumferentially spaced openings extending axially therethrough opening into said cavity and wherein said unloading valve means includes a pair of axially shiftable valve rings having flat sealing faces in confronting relation to said end faces, biasing means urging said rings in axially opposite directions to cause said sealing faces to engage said end faces and thereby seal off said cavity from said openings and thrust elements reciprocably mounted in a plurality of said openings.

3. The structure set forth in claim 2 wherein annular grooves are formed in said end faces to interconnect said openings.

4. The structure set forth in claim 3 wherein said biasing means includes a spring interposed between said valve rings.

5. A piston adapted for installation in the cylinder of a double acting hydraulic jack comprising:
 a pair of identical piston halves having reduced diameter portions with ends in axially confronting relation to one another,
  flat sealing faces formed, respectively, on the ends,
 a groove formed in each of said faces,
 passages extending axially through said piston halves, respectively, and terminating in said grooves, respectively,
 a pair of valve rings having sealing surfaces in sealing engagement with said sealing faces, respectively, on opposite radial sides of said grooves,
 means biasing said valve rings in opposite directions, and
 thrust elements in said passages extending beyond the axially outer ends, respectively, of said piston halves for moving said valve rings out of sealing engagement with said end faces when the piston reaches the end of the cylinder in which it is adapted to be installed.

6. The structure set forth in claim 5 wherein said thrust elements have enlarged diameter heads disposed within said grooves.

References Cited by the Examiner

UNITED STATES PATENTS

| 50,855 | 11/65 | Tannock | 92—257 |
| 940,068 | 11/09 | Robinson | 92—258 |
| 3,059,622 | 10/62 | Sexauer | 91—401 |

FOREIGN PATENTS 1,125,999   7/56   France.

FRED E. ENGELTHALER, *Primary Examiner.*